(12) United States Patent
Bellows et al.

(10) Patent No.: US 12,391,084 B2
(45) Date of Patent: Aug. 19, 2025

(54) UTILITY-SCALE LITHIUM-ION BATTERY TRANSPORTERS

(71) Applicant: NOMAD TRANSPORTABLE POWER SYSTEMS, INC., Waterbury, VT (US)

(72) Inventors: Jonathan Edward Bellows, Waterbury, VT (US); Gregg Richard Noble, Saxtons River, VT (US); Alex David Perkins, North Ferrisburgh, VT (US); Lindsay Edward Gorrill, Coeur d'Alene, ID (US); Paul Brant Coombs, St. John's (CA); Nan Wu, St. John's (CA); Jason Jean Martin, Coeur d'Alene, ID (US); Mark Williams Hagedorn, North Plains, OR (US)

(73) Assignee: NOMAD TRANSPORTABLE POWER SYSTEMS, INC., Waterbury, VT (US)

( * ) Notice: Subject to any disclaimer, the term of this patent is extended or adjusted under 35 U.S.C. 154(b) by 0 days.

(21) Appl. No.: 18/546,742

(22) PCT Filed: Feb. 16, 2022

(86) PCT No.: PCT/US2022/016620
§ 371 (c)(1),
(2) Date: Aug. 16, 2023

(87) PCT Pub. No.: WO2022/178006
PCT Pub. Date: Aug. 25, 2022

(65) Prior Publication Data
US 2024/0131889 A1 Apr. 25, 2024
US 2024/0227481 A9 Jul. 11, 2024

Related U.S. Application Data

(60) Provisional application No. 63/150,155, filed on Feb. 17, 2021.

(51) Int. Cl.
*H01M 50/242* (2021.01)
*B60G 11/56* (2006.01)
(Continued)

(52) U.S. Cl.
CPC .............. *B60G 11/56* (2013.01); *B62D 63/08* (2013.01); *H01M 10/0525* (2013.01);
(Continued)

(58) Field of Classification Search
CPC ........... H01M 2220/20; H01M 50/249; H01M 50/204; H01M 50/242; B60P 7/16;
(Continued)

(56) References Cited

U.S. PATENT DOCUMENTS

2002/0171219 A1* 11/2002 Sorum ................. B60G 21/106
280/124.16
2003/0085562 A1 5/2003 Sparling
(Continued)

FOREIGN PATENT DOCUMENTS

CN 201309445 9/2009
CN 102420451 4/2012
(Continued)

OTHER PUBLICATIONS

Drofa, Automotive Body for Fragile Cargoes, Aug. 27, 2013, EPO, RU 2491185 C1, Machine Translation of Description (Year: 2013).*
(Continued)

*Primary Examiner* — Paul N Dickson
*Assistant Examiner* — Matthew D Lee
(74) *Attorney, Agent, or Firm* — Perry + Currier Inc.

(57) ABSTRACT

An example of an apparatus to transport utility-scale lithium-ion batteries in a racked and operational state. The apparatus includes a base and an isolation platform. In addition, the apparatus includes an isolator mounted on the base to support the isolation platform. The isolator is to
(Continued)

dampen forces exerted on the isolation platform from the base. Furthermore, the apparatus includes a rack mounted onto the isolation platform. The rack is to secure a plurality of lithium-ion batteries to store energy at a utility-scale to be provided to a power distribution network. The plurality of lithium-ion batteries is racked in an operational state during transportation.

20 Claims, 9 Drawing Sheets

(51) Int. Cl.
- *B62D 63/08* (2006.01)
- *H01M 10/0525* (2010.01)
- *H01M 50/204* (2021.01)
- *H01M 50/24* (2021.01)
- *H01M 50/249* (2021.01)

(52) U.S. Cl.
CPC ......... *H01M 50/204* (2021.01); *H01M 50/24* (2021.01); *H01M 50/242* (2021.01); *H01M 50/249* (2021.01); *B60G 2202/12* (2013.01); *B60G 2202/242* (2013.01); *B60G 2300/042* (2013.01); *H01M 2220/20* (2013.01)

(58) Field of Classification Search
CPC ............... B60G 11/56; B60G 2202/12; B60G 2202/242; B62D 63/08
See application file for complete search history.

(56) References Cited

U.S. PATENT DOCUMENTS

| | | | |
|---|---|---|---|
| 2003/0162091 A1* | 8/2003 | Watanabe | H01M 50/124 429/156 |
| 2017/0346322 A1* | 11/2017 | Kuran | H01M 10/482 |
| 2020/0052268 A1* | 2/2020 | Gaither | H01M 10/486 |

FOREIGN PATENT DOCUMENTS

| | | | | |
|---|---|---|---|---|
| CN | 103779939 | | 5/2014 | |
| CN | 205168305 U | | 4/2016 | |
| CN | 109455133 A | * | 3/2019 | |
| CN | 220076536 U | * | 11/2023 | |
| DE | 102014200879 A1 | * | 7/2015 | ............ B65D 85/84 |
| EP | 3499605 A1 | | 6/2019 | |
| JP | H07232669 | | 9/1995 | |
| KR | 10-1978652 | | 5/2019 | |
| KR | 102533231 B1 | * | 5/2023 | |
| RU | 2491185 | | 8/2013 | |
| RU | 2491185 C1 | * | 8/2013 | |
| WO | WO-2010040520 A2 | * | 4/2010 | .......... H01M 2/0242 |
| WO | WO-2012028237 A1 | | 3/2012 | |
| WO | 2012/154990 | | 11/2012 | |
| WO | 2016/044651 | | 3/2016 | |

OTHER PUBLICATIONS

Kemper, Lithium Ion Battery, Apr. 15, 2010, EPO, WO 2010040520 A2, Machine Translation of Description (Year: 2010).*
PCT International Application No. PCT/US22/16620, International Search Report and Written Opinion of the International Searching Authority, dated May 19, 2022, 8 pages.

* cited by examiner

UTILITY-SCALE LITHIUM-ION BATTERY TRANSPORTERS

CROSS-REFERENCE TO RELATED APPLICATION

This application is the National Stage filing under 35 U.S.C. 371 of International Application No. PCT/US2022/016620, filed Feb. 16, 2022, which claims priority to and the benefit of U.S. Provisional Patent Application No. 63/150,155, filed Feb. 17, 2021, which are incorporated by reference in their entireties.

BACKGROUND

Electricity and the delivery of electricity plays a major role in industrial development, economic development, and for personal use in daily life. Electricity may be generated to supply a power system or power grid. The demand of the power grid may fluctuate through time, in short intervals such as throughout the day, or over longer periods of time such as seasons of the year. For example, air conditioning energy loads may increase the amount of demand for electricity for the grid during the summer months, while this demand may vanish in the winter months. When the demand for electricity increases, the supply of electricity may not be able to be increased beyond an infrastructure limit. Accordingly, energy sources, such as generating stations are typically designed to provide the peak electricity demanded. When the demand exceeds this amount, the power system may not be able to maintain the specified power requirements of the loads resulting in brownouts, blackouts, or increases in power costs as the supplier adjusts and purchases electricity from the active, open market.

Energy storage systems may be used at the utility-scale to balance electricity supply and demand. In particular, lithium-ion batteries provide a high energy efficiency, long cycle life, and high energy density storage platform. Due to the weight and safety issues associated with moving charged utility-scale lithium-ion batteries, they are generally shipped in an uncharged and non-racked state to a location to be installed and charged for use. Accordingly, these utility-scale energy storage systems are generally at a fixed location and involve significant assembly and disassembly processes when the batteries are moved from one location to another. In practice, this generally means that lithium-ion batteries are only deployable at a specific location connected to one point on an electric grid where they remain for an extended period of time, typically ten to twenty years.

SUMMARY

In accordance with an aspect of the invention, an apparatus is provided. The apparatus includes a base and an isolation platform. The apparatus further includes an isolator mounted on the base to support the isolation platform, wherein the isolator is to dampen forces exerted on the isolation platform from the base. In addition, the apparatus includes a rack mounted onto the isolation platform. The rack is to secure a plurality of lithium-ion batteries to store energy at a utility-scale to be provided to a power distribution network. The plurality of lithium-ion batteries is to be racked in an operational state during transportation.

The base includes a transportation system. In particular, the base may be a trailer to be towed by a tractor.

The apparatus may further include an enclosure to protect the plurality of lithium-ion batteries from weather elements.

In addition, the apparatus may include a dampener to connect a top portion of the rack to a ceiling of the enclosure. The dampener may secure the rack and to reduce motion of the rack relative to the base.

The apparatus may also include a shock sensor to collect force data of the forces exerted on the plurality of lithium-ion batteries. The apparatus may include a monitoring system to transmit the force data to an operator during transportation. The monitoring system may include a memory storage unit to store the force data.

The apparatus may include a weather sensor or a weather sensor array to collect weather data associated with conditions to which the plurality of lithium-ion batteries is subjected.

In accordance with another aspect of the invention, another apparatus is provided. The apparatus includes a trailer. The apparatus further includes a pneumatic suspension system disposed on the trailer to reduce road vibrations at a top surface of the trailer during transport. In addition, the apparatus includes a plurality of isolator springs mounted on the top surface of the trailer. Furthermore, the apparatus includes an isolation platform supported by the plurality of isolator springs. Each isolator spring is to reduce trailer vibrations on the isolation platform.

In accordance with another aspect of the invention, a method is provided. The method involves dampening forces exerted on an isolation platform with a plurality of isolators. The method further involves mounting a rack of lithium-ion batteries to store energy at a utility-scale to the isolation platform. In addition, the method involves transporting the lithium-ion batteries from a first location to a second location. The plurality of lithium-ion batteries is to be racked in an operational state during transportation. Furthermore, the method involves collecting force data of the forces exerted on the plurality of lithium-ion batteries during transportation.

BRIEF DESCRIPTION OF THE DRAWINGS

Reference will now be made, by way of example only, to the accompanying drawings in which.

DETAILED DESCRIPTION

The demand for electricity may often fluctuate to create imbalances between power generation and power consumption. In particular, instantaneous demand for electrical energy is often unpredictable from day to day and may depend on various factors such as temperature, industrial manufacturing changes, and seasonal variations. The variations may result in challenges to the power distribution network in terms of electricity generation and distribution. To address this issue, a utility-scale energy storage system may be installed in the power distribution network, such as a power grid, to convert and store electricity from an energy source, such as a generation station, and to subsequently convert it back into electrical energy to be re-supplied into the power distribution network. In some examples, additional electrical energy above the generation rate of power distribution network during peak demand periods. During these periods, an energy storage system that has been pre-charged with power may supplement the electricity supplied in the power distribution network.

Although batteries may be used to provide portable electrical energy in portable energy storage system on small scales such as to power electric cars and other apparatus, such as portable equipment, at a remote work site, utility-scale energy storage systems, such as systems with a capacity greater than about 200 kilowatt-hours are typically stationary by design. In particular, utility-scale energy storage systems cannot be transported safely while in a charged or operational state due to the large amount of energy stored and weight of the batteries. An accident during transportation may result in a catastrophic event. Accordingly, the batteries for utility-scale energy storage solutions are generally transported in a safer non-operational state, or de-racked state. Therefore, the energy storage system is to be installed or racked up at the final location to be installed in a fixed facility. Prior to moving the batteries of the utility-scale energy storage system, the batteries are to be de-racked and converted into a non-operational state for safe transportation.

An apparatus is provided to transport utility-scale lithium-ion batteries in a racked and operational state to different locations that may experience temporarily large swings in electricity consumption. The utility-scale lithium-ion batteries may be used to provide energy storage to supplement electricity generation during periods of peak electricity usage on a power grid and to receive excess energy for storage during periods of low electricity usage on the power grid. The utility-scale lithium-ion batteries may then be moved from one location to another to avoid idling when the utility-scale lithium-ion batteries are not used, such as during prolonged periods of low electricity usage. Accordingly, this allows the utility-scale lithium-ion batteries to be moved and deployed at a new location much faster and to avoid the utility-scale lithium-ion batteries staying in a single location idling when not in use.

Figure 1:
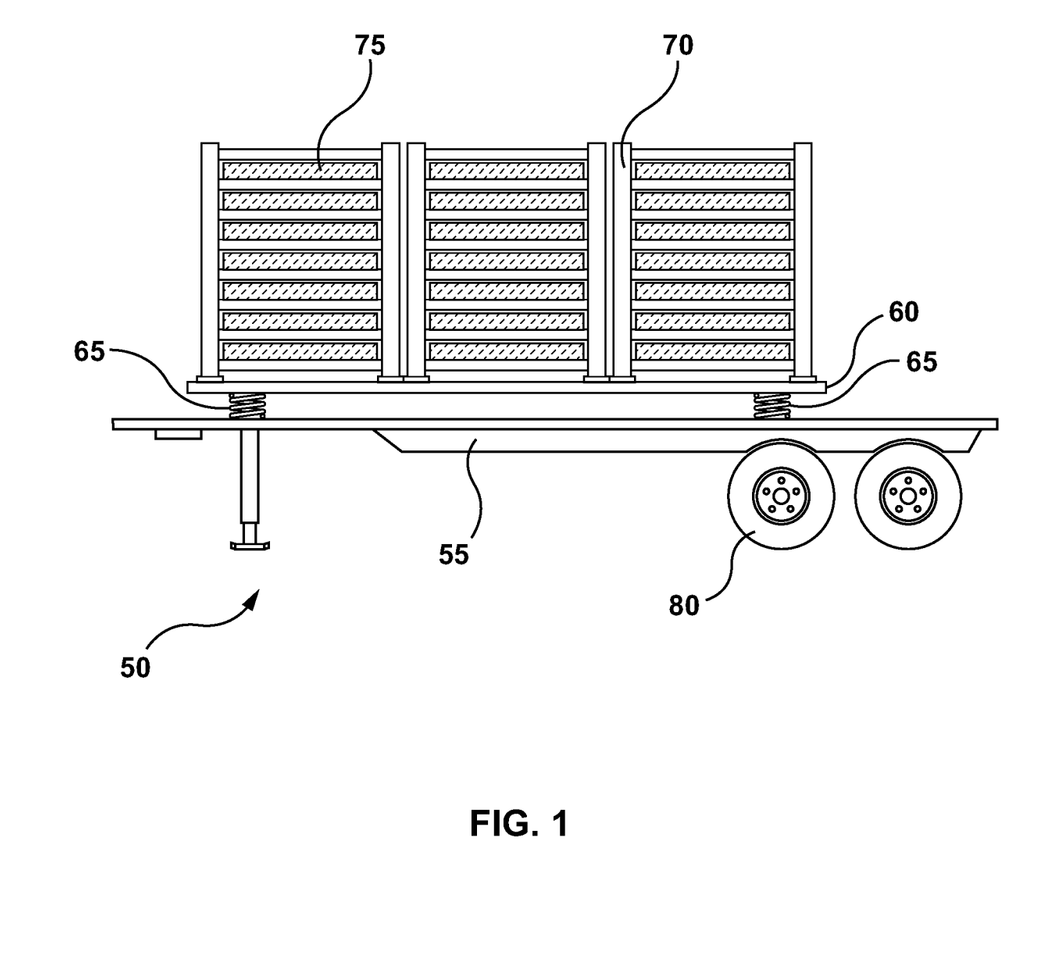
FIG. 1 is a side view representation of an example of an apparatus to transport utility-scale lithium-ion batteries in a racked and operational state to different locations.

Referring to FIG. 1, a schematic representation of an apparatus to transport utility-scale lithium-ion batteries in a racked and operational state to different locations is generally shown at 50. The apparatus 50 may include additional components, such as various additional interfaces and/or input/output devices such as additional sensors and indicators. In addition, the apparatus 50 may also include electronics and other components to connect to a power distribution network via a docking station. In the present example, the apparatus includes a base 55, an isolation platform 60, an isolator 65, and a rack 70 to secure a plurality of lithium-ion batteries 75 thereon.

The base 55 is to support the components of the apparatus 50. In the present example, the lithium-ion batteries may weigh over about 30,000 kilograms. Accordingly, the base 55 is to be able to mechanically support the mass of the batteries. The materials from which the base 55 is constructed is not particularly limited. In the present example, the base 55 is constructed from a plurality of steel beams to form a flatbed trailer. Accordingly, the base 55 may further include a transportation system 80, such as wheels on an axle. The trailer may then be towed by a tractor from one location to another location. It is to be appreciate by a person of skill with the benefit of this description that the base 55 may include additional components typically found on trailers. Furthermore, the transportation system 80 is not particularly limited and may include mechanisms for other modes of transportation such as rail as a railcar, or water as a barge.

The isolation platform 60 is to be mounted onto the base 55 with an isolator 65. In the present example, the isolator 65 is securely mounted to the base 55 of the isolation platform 60 is to be supported above the base 55 by the isolator 65. The isolator 65 is to dampen forces exerted on the isolation platform 60, such as vibrations and acceleration forces associated with road travel that are applied to the base 55.

The isolator 65 is not particularly limited and may be any device capable of supporting the weight of the isolation platform 60 the components, such as the rack 70 and the plurality of lithium-ion batteries 75, mounted thereon. In the present example, the isolator 65 is a coil spring suspension system. In other examples, the isolator 65 may be a leaf-spring system or a gel damper pad, or a hydraulic or pneumatic piston assembly, or various polymers, visco-elastic polymers, visco polymers or simply polymers designed for shock reduction purposes, or a SALT (Shock-Absorbant Liquid) cushion. Furthermore, the number of elements of the isolator 65 used to support the isolation platform 60 is not particularly limited and may depend on the weight of the lithium-ion batteries 75 as well as other components on the isolation platform 60. Accordingly, although only two elements of the isolator 65 are illustrated in FIG. 1, more or less may be used.

In the present example, the rack 70 is mounted onto the isolation platform 60 to secure the lithium-ion batteries 75. In the present example, the lithium-ion batteries 75 collectively provide the capacity to store energy at a utility-scale, such as with a capacity greater than about 200 kilowatt-hours, for use with a power distribution network. The power distribution network to which the apparatus connects is not particularly limited to any type of network as multiple applications are contemplated. For example, the power distribution network may by a public utility power grid, a private system used to power a factory or group of small buildings to supplement a public power grid, or a closed system to provide electricity to a construction site, a mining site, a disaster recovery zone, or military forward operating base or other remote location far from a public power grid.

The manner by which the rack 70 is mounted onto the isolation platform 60 is not particularly limited. For example, the rack 70 may be built into the isolation platform 60 forming a unitary body. In other examples, the rack 70 may be welded onto the isolation platform 60. In further examples, the rack 70 may be mounted using other methods such as fasteners, straps and bolts. Similarly, the manner by which the lithium-ion batteries 75 are secured to the rack 70 is not limited and may include welding or fastening to connection points disposed on the rack 70.

By mounting the lithium-ion batteries 75 onto the rack 70 and isolation platform 60, the lithium-ion batteries 75 may be maintained in a racked position and in an operational state during transportation between docking stations. In particular, the lithium-ion batteries 75 may be disconnected from a docking station in a charged state at one location and transported to another location in the charge state to be simply plugged in and operated without any further initiation processes. Without addressing potential damage to the lithium-ion batteries 75 that may be caused by forces from the road, such as vibrations and acceleration forces, transporting the lithium-ion batteries 75 which have utility-scale capacities in a charged state is considered dangerous.

Figure 2A:
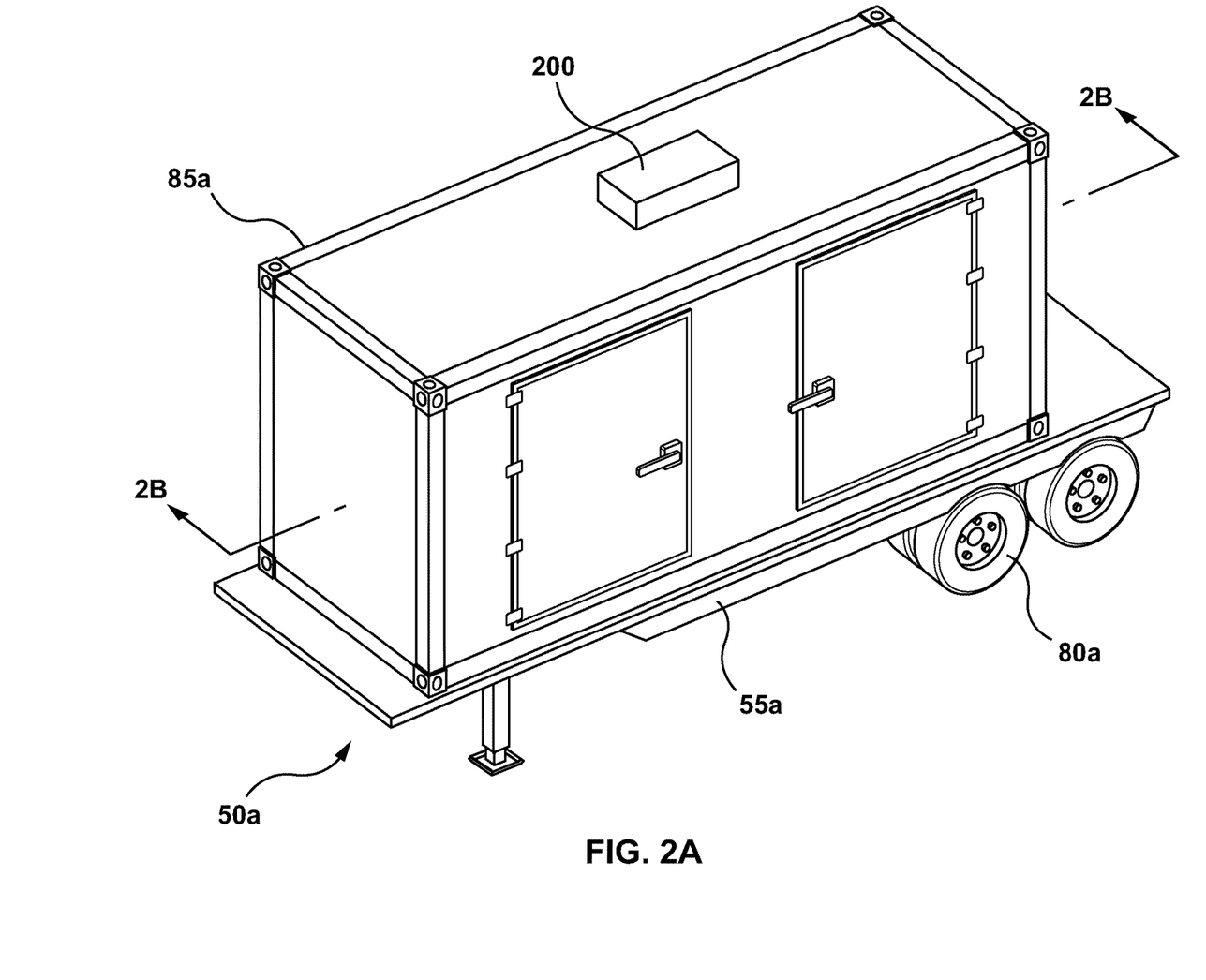
FIG. 2A is a perspective view representation of an example of an apparatus with an enclosure to transport utility-scale lithium-ion batteries in a racked and operational state to different locations.
Figure 2B:
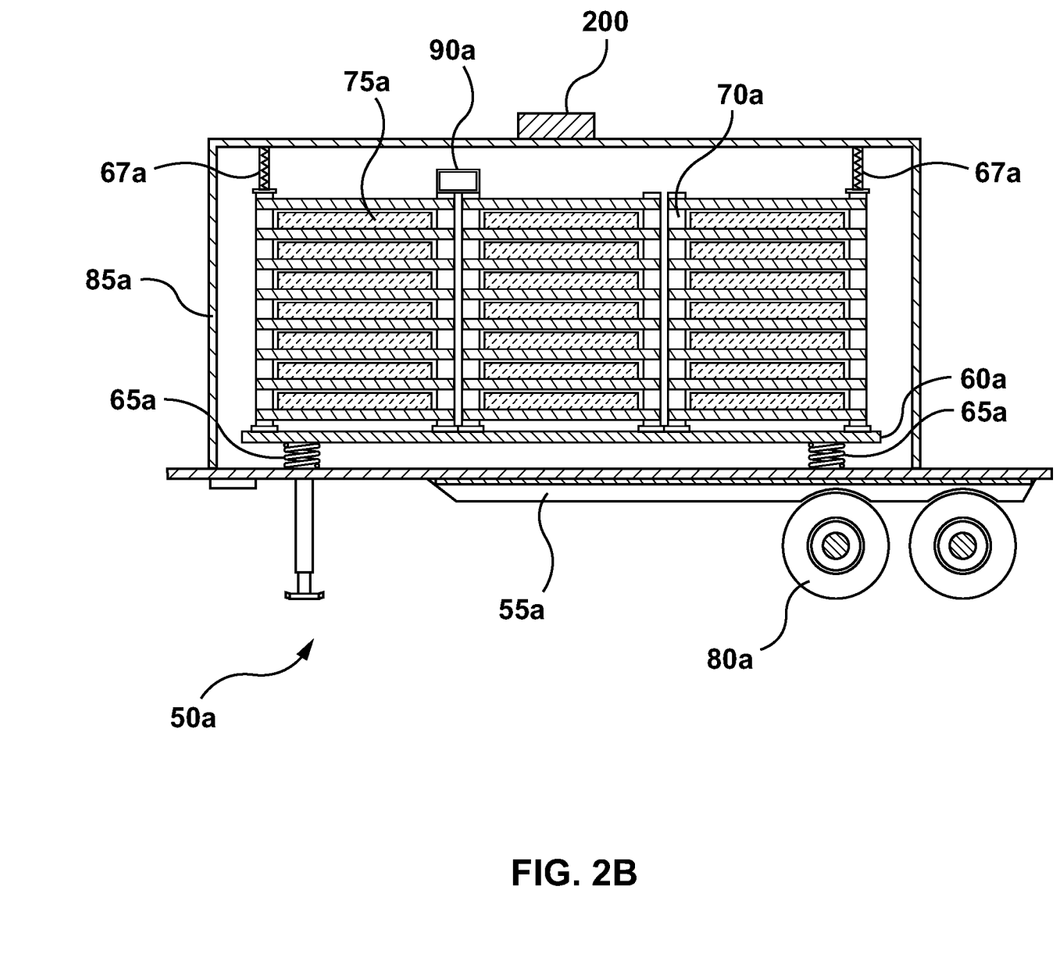
FIG. 2B is a cross sectional view of the example of the apparatus to transport utility-scale lithium-ion batteries shown in FIG. 2A along the plan 2B-2B.

Referring to FIGS. 2A and 2B, a representation of another apparatus 50a to transport utility-scale lithium-ion batteries in a racked and operational state to different locations is generally shown. Like components of the apparatus 50a bear like reference to their counterparts in the apparatus 50, except followed by the suffix "a". In the present example, the apparatus 50a includes a base 55a, an isolation platform 60a, an isolator 65a, a dampener 67a, a rack 70a to secure a plurality of lithium-ion batteries 75a, an enclosure 85a, and a sensor 90a.

In the present example, the base 55a is substantially similar to the base 55. In particular, the base 55a is to support the weight of the lithium-ion batteries 75a, which may be over about 30,000 kilograms in some implementations. Furthermore, the base 55a also includes a transportation system 80a to function as a trailer to be towed by a tractor between locations in the present example.

The apparatus 50a further includes an enclosure 85a to protect sensitive equipment, such as the lithium-ion batteries 75a. In particular, the enclosure 85a may shield the lithium-ion batteries 75a from weather elements such as wind, rain, snow, or sunlight during operation. In addition, the enclosure 85a may protect the contents during transportation from weather elements as well as road hazards, such as rocks and other debris.

The enclosure 85a is not particularly limited and may be varied. In particular, the enclosure 85a may be modified based on the expected locations where the apparatus 50a is to be deployed and the anticipated weather conditions for that location. For example, the enclosure 85a may include thermal insulation properties to protect against large temperature changes. To complement the thermal insulation, the apparatus may also include an additional heating, air conditioning, and ventilation systems to control the conditions inside the enclosure 85a. By controlling the conditions inside the enclosure 85a, the performance of the lithium-ion batteries 75a may be improved as well as the lifetime of the lithium-ion batteries 75a. In other examples, the enclosure 85a may be include fireproof panels, deflagration panels, or be reinforced to withstand an explosion if a battery fails. It will be understood that by containing fire during a battery failure, the safety of the apparatus 50a is improved. The safety may be further improved by installing a fire suppression system, emergency ventilation systems, such as with automated dampers, and a traditional fire suppression system, such as a dry deluge standpipe leading to a sprinkler system.

In the present example, the apparatus 50a further includes a dampener 67a to connect the top portion of the rack 70a to the ceiling of the enclosure 85a. The ceiling mounted dampener 67a is to secure the top of the rack 70a to further reduce motion of the rack 70a relative to the base 55a. By reducing the relative motion, the forces and vibrations associated with road travel and experienced by the lithium-ion batteries 75a may be further suppressed.

It is to be appreciated by a person of skill with the benefit of this description that the dampener 67a may be modified in other examples. For example, the dampener 67a may not mounted onto a sidewall of the enclosure 85a instead of the ceiling. In other examples, the upper portion of the rack 70a may also be secured to other portions of the enclosure 85a or structures within the enclosure 85a to reduce vibrational and acceleration forces.

The apparatus 50a also includes a sensor 90a. The sensor 90a is not particularly limited and may be any type of sensor to collect data that may be used to determine a status of the lithium-ion batteries 75a, or to be used as a predictor of the lifetime of the lithium-ion batteries 75a. Furthermore, the location of the sensor 90a is not limited and may be varied depending on the type of sensor. For example, the sensor 90a may be disposed on the exterior of the enclosure 85a or on another part.

As an example, the sensor 90a may be a shock sensor to collect force data associate of the forces exerted on the plurality of lithium-ion batteries 75a. In this example, the sensor 90a is to measure movements. The manner by which movement is measured is not limited and may include a set-point or proximity switch. In other examples, movements may also be measured or inferred from an accelerometer. By placing such as sensor 90a on top of the rack 70a, the sensitivity to movement may be increased if the entire rack 70a were to sway during transportation. In other examples, the sensor 90a may be placed on the dampeners 67a, the wall or ceiling of the enclosure 85a, within the isolators 65a, or on the isolation platform.

In another example, the sensor 90a may be an environmental or weather sensor to deter the climate. For example, the sensor 90a may be a pyranometer to measure sunlight, a wind sensor, a barometer, a temperature sensor, and/or a humidity sensor. The sensor 90a may also be disposed at a different location, on the apparatus 50a, such as on the wall of the enclosure 85a to more accurately measure conditions. Furthermore, it is to be appreciated in this example, the sensor 90a may be used to collect weather data associated with the conditions in which the apparatus 50a is operating or during transportation. Accordingly, the weather data may provide historical data for conditions to which the lithium-ion batteries 75a were subjected. It is to be appreciated by a person of skill with the benefit of this description that the historical data may be used to estimate the remaining lifetime of the lithium-ion batteries 75a. In other examples, the historical data may also be used to verify proper maintenance of the lithium-ion batteries 75a if a warranty claim were to be made or to determine if a leased apparatus 50a were abused.

Figure 3:
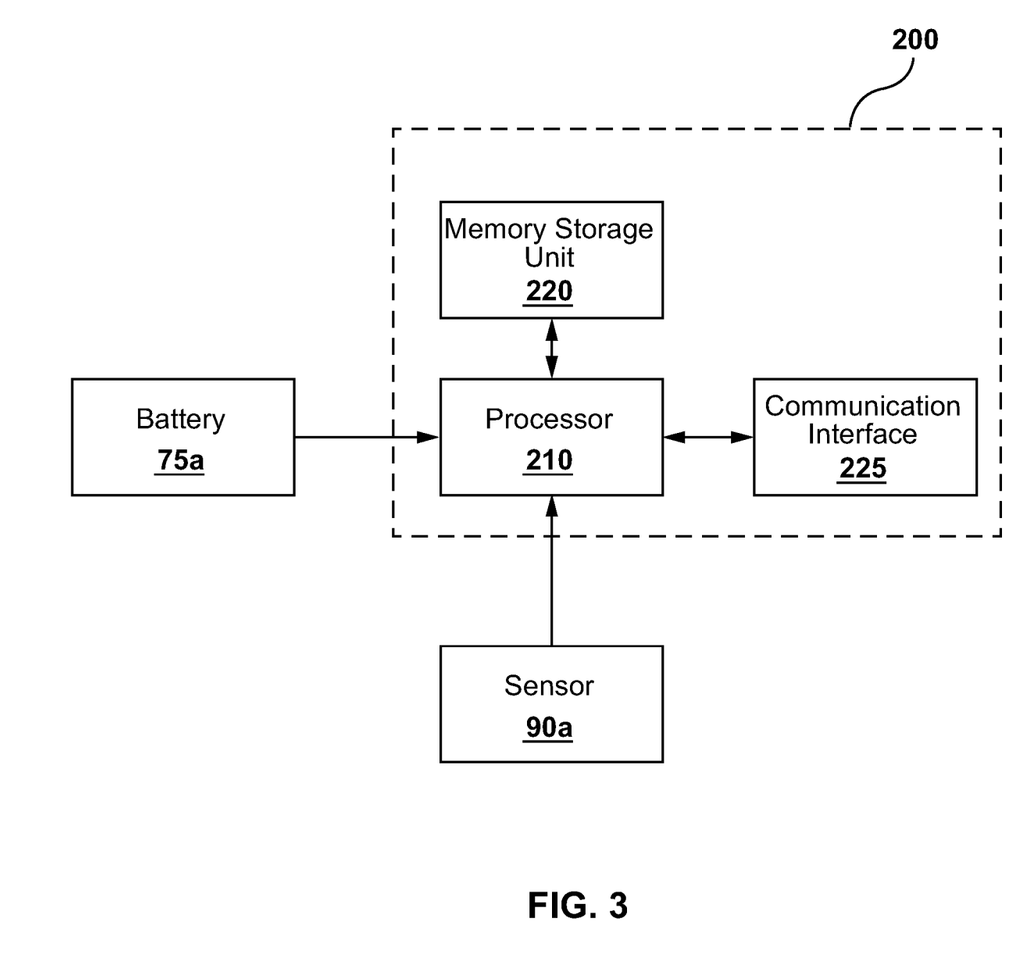
FIG. 3 is a schematic representation of an example of a monitoring system.

Referring to FIG. 3, a schematic representation of a monitoring system 200 is shown. In order to assist in the explanation of the monitoring system 200, it will be assumed that the monitoring system 200 is in communication with the apparatus 50a. In the present example, the monitoring system 200 is mounted onto the roof of the enclosure 85a.

In the present example, the monitoring system 200 is in communication with the lithium-ion batteries 75a and the sensor 90a. The manner by which the monitoring system 200 communicates with the lithium-ion batteries 75a and the sensor 90a is not particularly limited. For example, the monitoring system 200 may communicate via a wired connection. In other examples, the monitoring system 200 may communicate wirelessly, such as with a BLUETOOTH or WIFI connection. It is to be appreciated by a person of skill with the benefit of this description that the apparatus 50a may include additional components in communication with the monitoring system 200. For example, the monitoring system 200 may be in communication with a plurality of additional sensors that may or may not be the same type as well as additional batteries. Furthermore, the following discussion of the monitoring system 200 may lead to a further understanding of the apparatus 50a and it components. In the present example, the monitoring system 200 includes a processor 210 in communication with the battery 75a and the sensor 90a, a memory storage unit 220, and a communications interface 225. Furthermore, in other examples, the monitoring system 200 may not be mounted on the enclosure 85a and instead be disposed at a separate location. In such an example, the monitoring system 200 may be in communication with multiple apparatuses 50a and located at a central monitoring facility.

In the present example, the lithium-ion batteries 75a may provide data to the processor 210. The processor 210 is configured to monitor data from the lithium-ion batteries 75a, which may include the charge level and battery health information.

The sensor 90a also provides sensor data to the processor 210. The sensor data received by the processor 210 is not particularly limited and may include data that may provide information to confirm that the battery 75a has not experience a force or other condition that is beyond the tolerances of the battery 75a. In the present example where the sensor 90a is a shock sensor, the sensor 90a may be disposed on the rack 70a to collect data during transportation. For example, the sensor 90a may be an accelerometer to detect the forces exerted on the rack 70a which may be inferred to be the forces exerted on the batteries 75a. The forces are not particularly limited and may include acceleration forces from starting and stopping as well as acceleration forces from turning or driving over bumps on the road. Accordingly, the sensor 90a may be used to monitor these forces and the processor 210 may provide a warning if the battery 75a was subjected to a sudden acceleration or deceleration, such as excessive braking or an accident, that exceeds the limits that the battery 75a.

As an example, the sensor 90a may be a temperature sensor disposed near the battery 75a to measure the temperature around the battery 75a. The processor 210 may further include a controller to operate a climate control system (not shown) to maintain a constant temperature and humidity within a predetermined operating range. In other examples, a temperature sensor may be used as a safety device to detect a runaway condition to warn a driver, sound an external alarm, or activate an emergency fire suppression system or an emergency ventilation system.

The memory storage unit 220 is to store the data collected by the sensor 215 or information generated by the monitoring system. In particular, the memory storage unit 220 is to generate a log of events and conditions to which the lithium-ion batteries 75a was subjected. Continuing with the present example where the sensor 90a is a shock sensor, the memory storage unit 220 may store force data collected by the sensor 90a. The memory storage unit 220 is not particularly limited. In the present example, the memory storage unit 220 is a non-transitory machine-readable storage medium that may be any electronic, magnetic, optical, or other physical storage device. In other examples, the memory storage unit 220 may be a separate device external from the battery 75a, such as an external server in the cloud.

The communications interface 225 is to communicate with an external device to which the data about the battery 75a to be transmitted. In the present example, the communications interface 225 may communicate with an external device over a network, which may be a public cellular network to a central location. In this example, the conditions of the battery 75a may be monitored at a central location so that if an issue occurs, a service call or replacement unit may be dispatched immediately. In other examples, the communications interface 225 may transmit the data to an external device near the driver or operator such that the driver of the vehicle may monitor the status and conditions the battery 75a during transportation. The external device is not limited and may be a smartphone or tablet carried by the driver or operator in some examples. In other examples, the external device may be a panel in the cab of the tractor moving the apparatus 50a that is either hardwired to wirelessly connected to the monitoring system 200. Accordingly, the driver or operator of the tractor moving the apparatus may receive the force data from the sensor 90a in real time and adjust driving habits.

In further examples, the sensor 90a may be an environmental sensor or sensor array to detect the conditions proximate to the battery 75a. In particular, the sensor 90a may measure solar radiation via pyranometer, wind speed, barometric pressure, temperature, and humidity. The processor 210 may store this weather data to determine a target charge-discharge schedule to increase performance of the battery 75a. For example, if the weather indicates that there will be a high demand for air conditioning, the processor 210 may direct the battery to delay charging until the demand decreases to provide predictive analytics. The predictive analytics may subsequently be used to cycle the battery 75a in a more efficient manner.

In addition, the weather data may also be used for system preventative care, emergency planning, or disaster recovery purposes. In the present example, the sensor 90a may be able to predict significant storm events and may direct an apparatus 50a to pre-charge in anticipations of potential outage periods. In further examples, the processor 210 may be combined with other infrastructure such as a remote dispatcher via the communications interface 225. Based on information received from a network of apparatuses spread across a region, the processor 210 may provide information to move an apparatus away from a danger or to prepare for extreme conditions by automatically entering into a self-protecting state (pre-charging in advance of a grid outage) when barometric pressures drop suddenly or below predetermined threshold levels or when wind speeds pick up above predetermined threshold wind levels. The processor may also send an alarm such that an administrator is alerted to an extreme condition. Therefore, the sensor 90a and the monitoring system may allow for the protection from incoming storms. In particular, when an adverse weather condition is detected, the apparatus may be redeployed safely away from the adverse conditions until the conditions pass.

Referring to FIGS. 4A, 4B, 4C, and 4D, another apparatus 50b and detailed views of portions of the apparatus 50b to transport utility-scale lithium-ion batteries in a racked and operational state to different locations is generally shown.

Like components of the apparatus 50b bear like reference to their counterparts in the apparatus 50a, except followed by the suffix "b". In the present example, the apparatus 50b includes a trailer 55b, an isolation platform 60b, a plurality of isolator springs 65b, and a pneumatic suspension system 84b. In the present example, the apparatus 50b further includes an enclosure 85b which may be omitted in other examples where the load carried by the apparatus 50b is not substantially affected by weather elements.

Figure 4A:
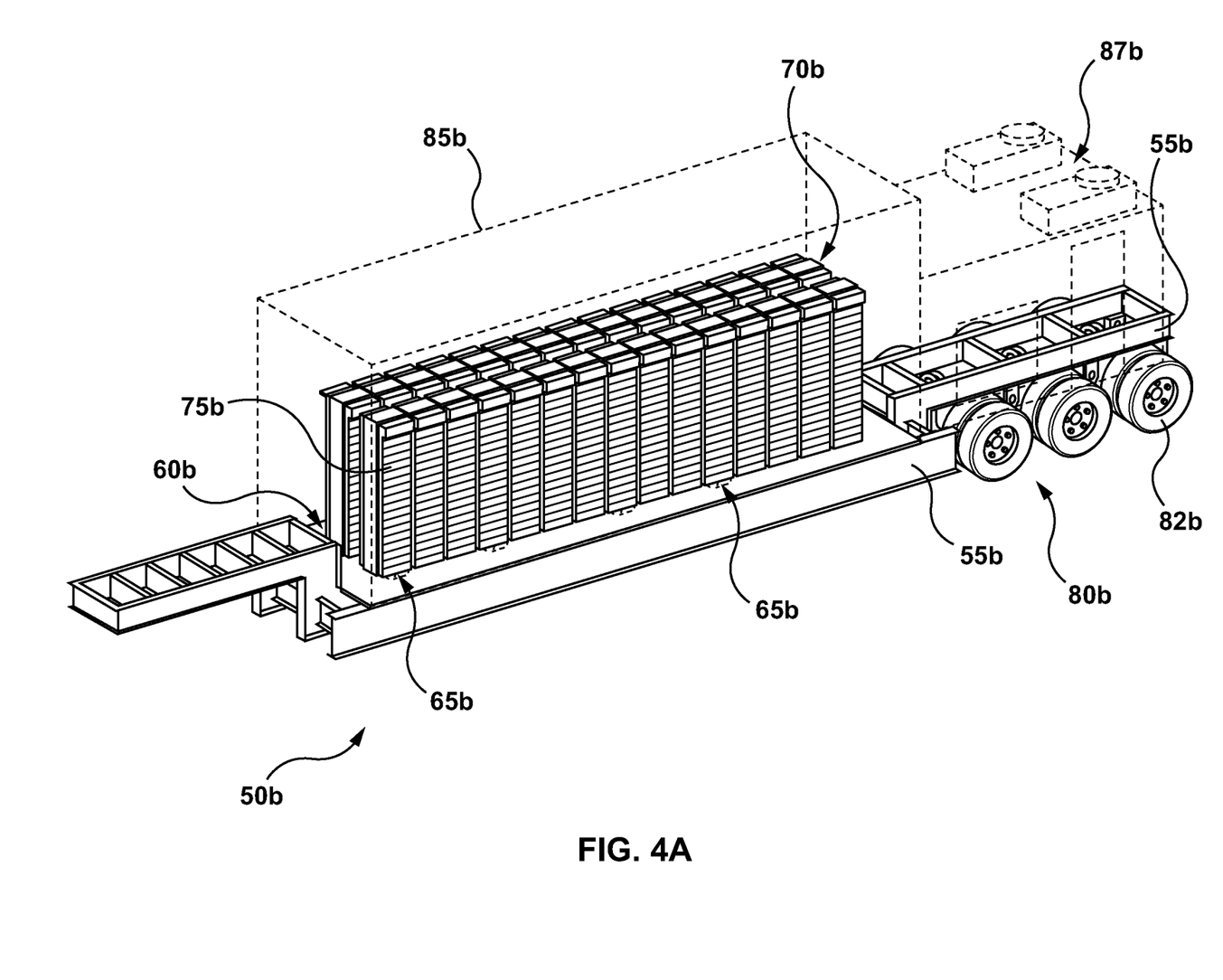
FIG. 4A is a perspective view representation of another example of an apparatus to transport utility-scale lithium-ion batteries in a racked and operational state to different locations.
Figure 4B:
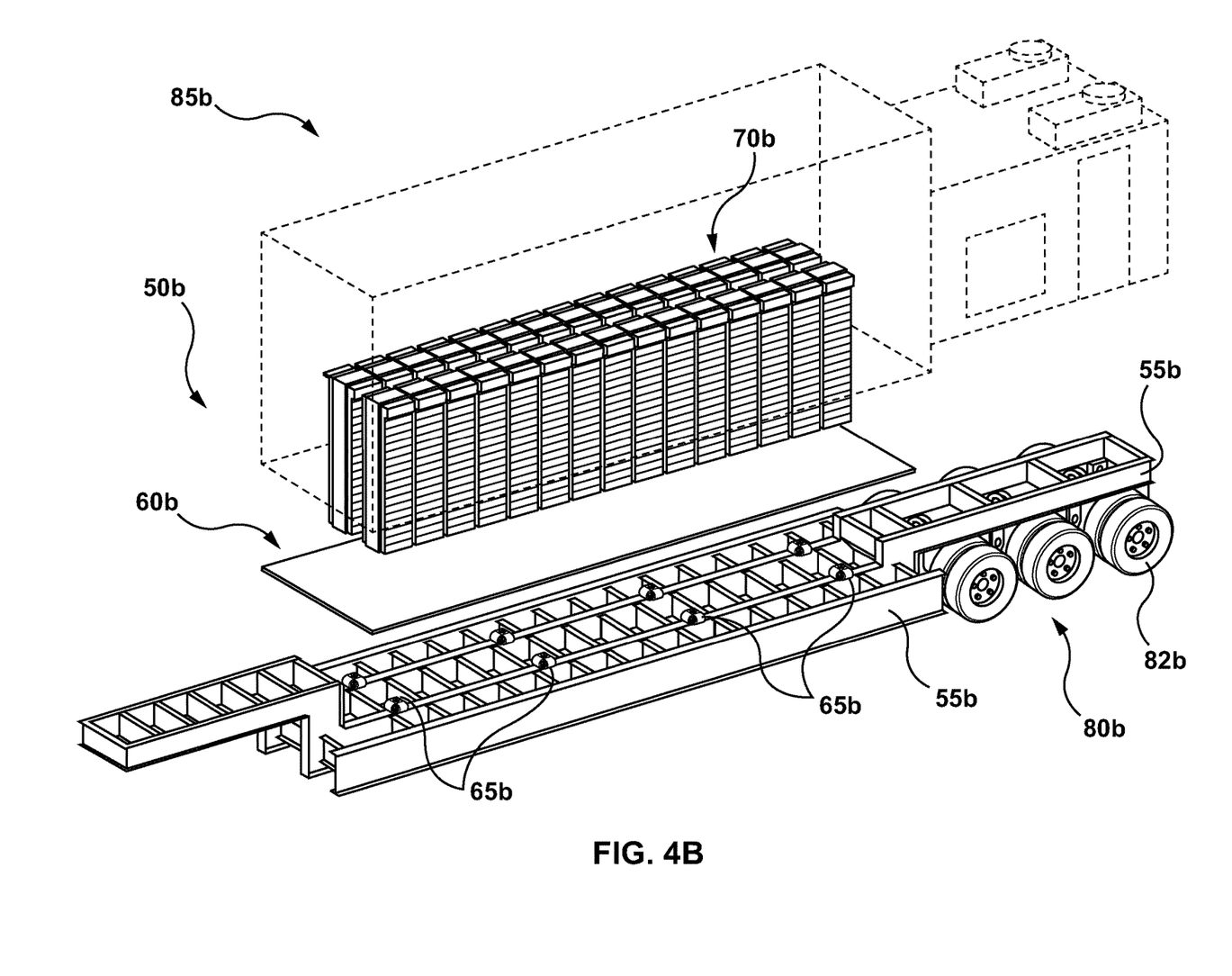
FIG. 4B is an exploded view of the example of an apparatus to transport utility-scale lithium-ion batteries shown in FIG. 4A.

Furthermore, the apparatus 50b may further include an equipment room 87b to house control systems, electrical components, and mechanical components. For example, the control room 87b may include power conversion and distribution systems with inverters to convert direct current power from the batteries to alternating current for a power distribution network as well as converters to convert alternating current to direct current to charge the batteries. In addition, the equipment room 87b may include a heating, air conditioning and ventilation system to control the environment within the enclosure 85b. In the present example, the equipment room 87b may include systems to control the humidity within the enclosure 85b.

The trailer 55b is to support the components to be transported by the apparatus 50b. In the present example, the apparatus 50b is to transport a plurality of lithium-ion batteries 75b mounted on racks 70b. The lithium-ion batteries 75b and the racks 70b may be replaced with other components to be transported with the apparatus 50b to reduce road vibrations, such as sensitive or delicate equipment. In the present example, the lithium-ion batteries 75b on the racks 70b may weigh over about 30,000 kilograms. Accordingly, the trailer 55b is configured to mechanically support the mass of the lithium-ion batteries 75b. In the present example, the trailer 55b is constructed from a plurality of steel beams to form a trailer structure on which the lithium-ion batteries 75b and racks 70b may be mounted. In the present example, the trailer 55b also includes a transportation system 80b, with a plurality of wheels 82b and a pneumatic suspension system 84b. In the present example, the apparatus 50b further includes an enclosure 85b which may be omitted in other examples where the load carried by the apparatus 50b is not substantially affected by weather elements.

Figure 4C:
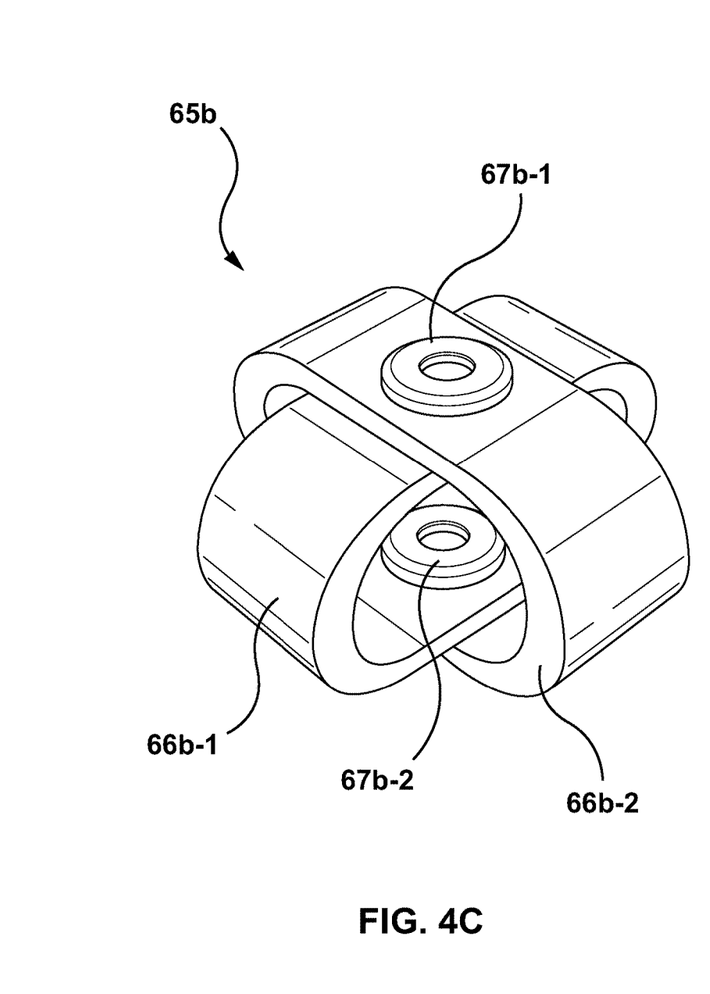
FIG. 4C is a view of an example of an isolator spring of the apparatus to transport utility-scale lithium-ion batteries shown in FIG. 4A.

In the present example, the isolator springs 65b are mounted onto the top surface of the trailer 55b as shown in FIG. 4B. The isolator springs 65b are to support the isolation platform 60b above the trailer 55b to reduce trailer vibrations. The isolator springs 65b are not particularly limited and may be any device capable of supporting the weight of the isolation platform 60b the intended load of lithium-ion batteries 75b on racks 70b mounted thereon. Referring to FIG. 4C, an isolator spring 65b is shown in greater detail. In the present example, the isolator spring 65b includes a pair of spring elements 66b-1 and 66b-2. The spring elements 66b-1 and 66b-2 are fastened together with fasteners 67b-1 and 67b-2. It is to be appreciated by a person of skill with the benefit of this description that the fasteners 67b-1 and 67b-2 are not particularly limited and may include a wide variety of fastening mechanism. In the present example, the fasteners 67b-1 and 67b-2 may be rivets. In other examples, the fasteners 67b-1 and 67b-2 may be bolts. Furthermore, the number of isolator springs 65b used to support the isolation platform 60b is not particularly limited and may depend on the weight of the lithium-ion batteries 75b as well as other components on the isolation platform 60b. Although the present example shows eight isolator springs 65b, the number of isolator springs 65b may be more or less in other examples.

Figure 4D:
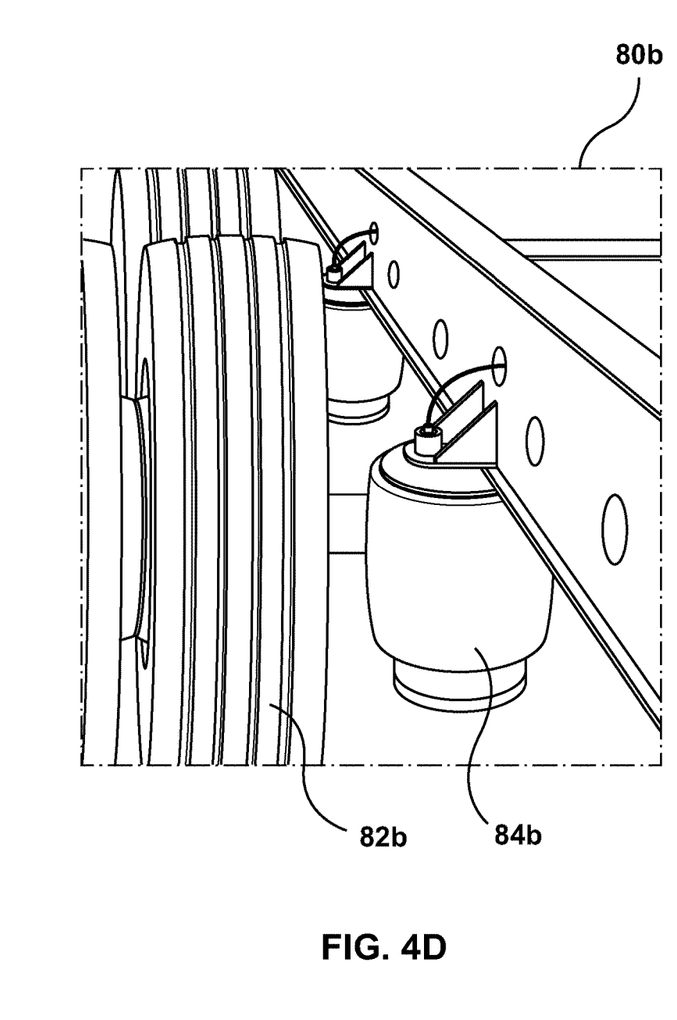
FIG. 4D is a view of an example of a pneumatic suspension system of the apparatus to transport utility-scale lithium-ion batteries shown in FIG. 4A.

In the present example, the trailer 55b includes a transportation system 80b with a pneumatic suspension system 84b to dampen seismic activity from road vibrations during transportation. The source of the road vibrations is not limited and may be a result of travel over an uneven road surface, weather elements, such as wind, forces from acceleration, deceleration, and turning during transportation. By reducing vibrations, potential damage to the load transported on the isolation platform 60b, such as the lithium-ion batteries 75b in the present example, is reduced.

The apparatus 50b may be used to transport a wide variety of loads that may benefit from a reduction in the amount of vibrations during transit. In the present example, the apparatus 50b may include rack 70b mounted onto the isolation platform 60b to secure a plurality of lithium-ion batteries 75b. In the present example, the lithium-ion batteries 75b collectively provide the capacity to store energy at a utility-scale, such as with a capacity greater than about 200 kilowatt-hours, for use with a power distribution network.

Figure 5:
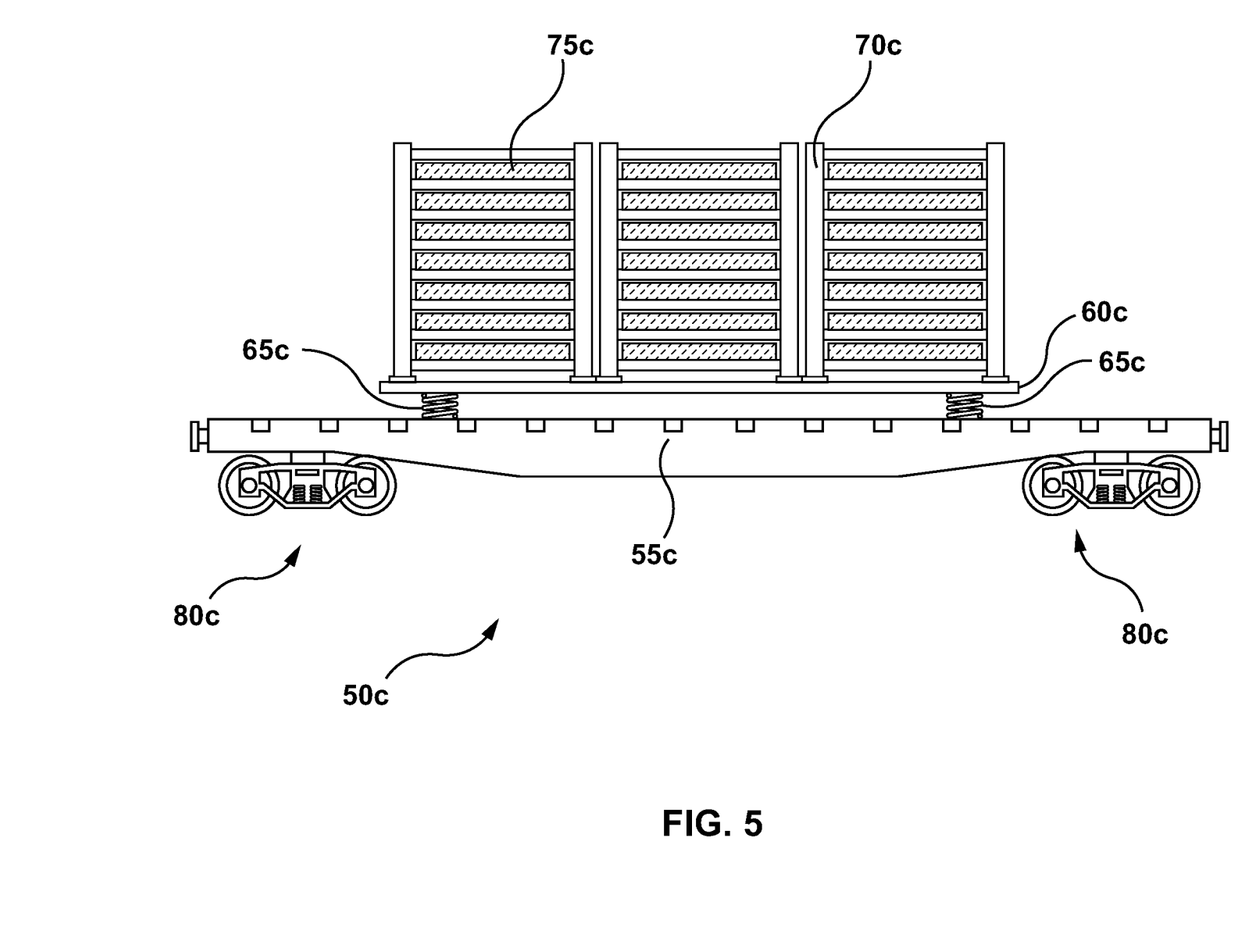
FIG. 5 is a side view representation of another example of an apparatus to transport utility-scale lithium-ion batteries in a racked and operational state to different locations.

Referring to FIG. 5, a representation of another apparatus 50c to transport utility-scale lithium-ion batteries in a racked and operational state to different locations is generally shown. Like components of the apparatus 50c bear like reference to their counterparts in the apparatus 50, except followed by the suffix "c". In the present example, the apparatus 50c includes a base 55c, an isolation platform 60c, an isolator 65c, a rack 70c to secure a plurality of lithium-ion batteries 75c, and a transportation system 80c. In this example, the transportation system 80c is rail wheels to allow the apparatus 50c to be transported via rail.

Figure 6:
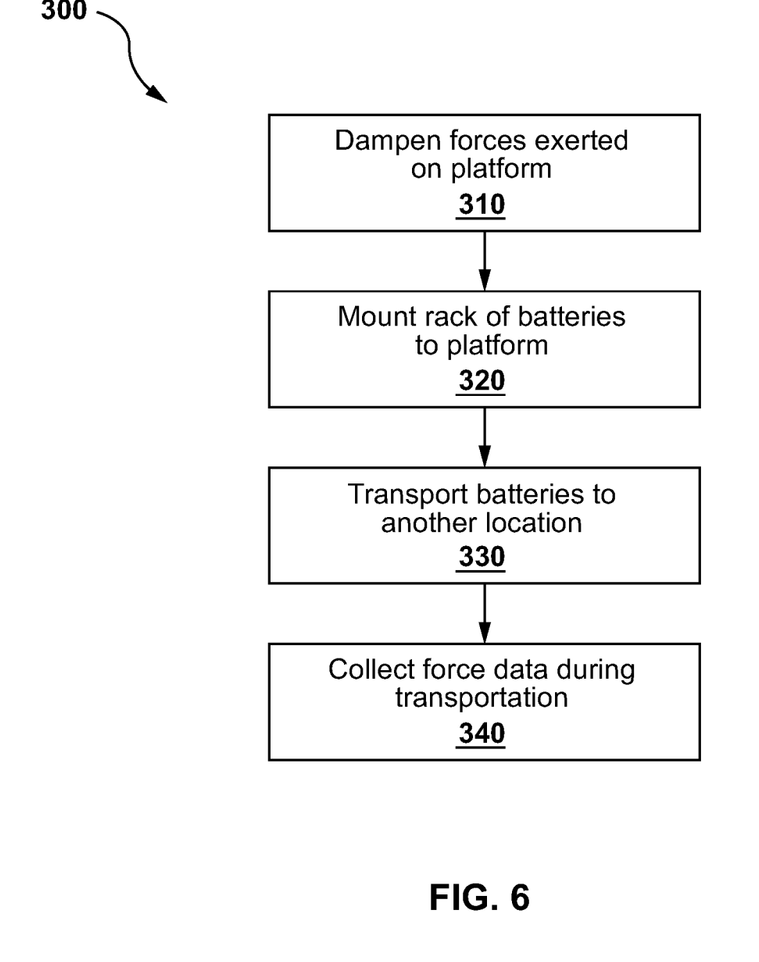
FIG. 6 is a flowchart of an example of a method of transporting utility-scale lithium-ion batteries in a racked and operational state.

Referring to FIG. 6, a flowchart of a method of transporting utility-scale lithium-ion batteries in a racked and operational state to different locations is generally shown at 300. In order to assist in the explanation of method 300, it will be assumed that method 300 may be performed by the apparatus 50. Indeed, the method 300 may be one way in which the apparatus 50 may be operated. Furthermore, the following discussion of method 600 may lead to a further understanding of the apparatus 50 and its components. In addition, it is to be emphasized, that method 300 may not be performed in the exact sequence as shown, and various blocks may be performed in parallel rather than in sequence, or in a different sequence altogether.

Beginning at block 310, forces exerted on the isolation platform 60 are to be dampened using a plurality of isolators 65. In the present example, the isolators 65 are to be installed between the base 55 and the isolation platform 60. Accordingly, any vibration of the base 55 will be absorbed by the isolator 65 prior to reaching the isolation platform 60.

Block 320 involves mounting the racks 70 along with a plurality of lithium-ion batteries 75 onto the isolation platform 60. The manner by which the lithium-ion batteries 75 are mounted to the isolation platform 60 is not particularly limited. For example, the racks 70 may be welded onto the isolation platform 60. In other examples, the racks 70 may be bolted onto the isolation platform 60. In other examples, the racks 70 may also be secured at other positions other than the isolation platform 60 with additional dampeners.

Upon securing the racks 70 and the plurality of lithium-ion batteries 75, the apparatus is to be transported from one location to another location while the plurality of lithium-ion batteries 75 is racked on the racks 70 and in an operational state at block 330. It is to be appreciated that by transporting the lithium-ion batteries 75 in a racked an operational state allows the installation and removal of the apparatus 50 from a site faster and more efficient than if the lithium-ion batteries 75 were to be disassembled and separately stored to avoid potential mechanical damage during transportation. Mechanical damage may result in a short circuit that generates additional heat, which may lead to further mechanical damage and damage to neighboring cells. This results in a positive feedback cycle that results in a thermal runaway, which is difficult to stop. It is to be appreciated by a person of skill with the benefit of this description that the risk of mechanical damage to the lithium-ion battery cells is reduced by the apparatus 50, as vibrational and acceleration forces are effectively and safely transferred to the lithium-ion battery cell support structure.

During the transportation of the apparatus 50c, force data may be collected to determine the amount of force exerted on the lithium-ion batteries 75. For example, force data may provide the greatest force exerted during a transit, such as from an accident or hard braking or turning event. The force data may also be able to provide statistics on the transit, such as the number of events where the force exceeds a threshold, the frequency of force events, and other data. Accordingly, the force data may then be used to provide an indication of the wear and tear the lithium-ion batteries 75 are subjected to for each transit and may be used for driver training and/or discipline. As another example of the use of force data, the force data may be provided to a central monitoring system or driver so that larger forces during transit may be detected in real time and adjustments to driving behavior may be implemented.

Various advantages will now become apparent to a person of skill with the benefit of this description. In particular, the apparatus 50 provides a fully functional lithium-ion battery energy storage system capable of quickly connecting to and disconnecting from a utility grid through a process that does not involve taking the batteries out of the operational state. The apparatus 50 may also include additional safety features for transportation, such as battery and force monitoring as well as lithium outgassing detection.

It should be recognized that features and aspects of the various examples provided above may be combined into further examples that also fall within the scope of the present disclosure.

What is claimed is:

1. An apparatus comprising:
   a base;
   an isolation platform;
   an isolator mounted on the base to support the isolation platform, wherein the isolator is to dampen forces exerted on the isolation platform from the base;
   a rack mounted onto the isolation platform; and
   a plurality of lithium-ion batteries to store energy at a utility-scale to be provided to a power distribution network, wherein the plurality of lithium-ion batteries is secured to the racked in an operational state, and wherein the plurality of lithium-ion batteries remain energized in the operational state during transportation.

2. The apparatus of claim 1, wherein the base includes a transportation system.

3. The apparatus of claim 2, wherein the base is a trailer to be towed by a tractor.

4. The apparatus of claim 1, further comprising an enclosure to protect the plurality of lithium-ion batteries from weather elements.

5. The apparatus of claim 4, further comprising a dampener to connect a top portion of the rack to a ceiling of the enclosure, wherein the dampener is to secure the rack and to reduce motion of the rack relative to the base.

6. The apparatus of claim 1, further comprising a shock sensor to collect force data of the forces exerted on the plurality of lithium-ion batteries continuously during transportation.

7. The apparatus of claim 6, further comprising a monitoring system is to transmit the force data to an operator during transportation.

8. The apparatus of claim 1, further comprising a weather sensor to collect weather data associated with conditions to which the plurality of lithium-ion batteries are subjected.

9. The apparatus of claim 1, further comprising a fire suppression system to improve safety of the plurality of lithium-ion batteries during transportation.

10. The apparatus of claim 1, wherein the isolator is an isolator spring comprising a first spring element and a second spring element, wherein the first spring element and the second spring element are substantially loops, and wherein the first spring element is fastened perpendicular to the second spring element.

11. An apparatus comprising:
    a trailer;
    an pneumatic suspension system disposed on the trailer to reduce road vibrations at a top surface of the trailer during transport;
    a plurality of isolator springs mounted on the top surface of the trailer;
    an isolation platform supported by the plurality of isolator springs, wherein each isolator spring is to reduce trailer vibrations on the isolation platform; and
    a plurality of lithium-ion batteries to store energy at a utility-scale, wherein the plurality of lithium-ion batteries is secured to the isolation platform in an operational state, and wherein the plurality of lithium-ion batteries remain energized in the operational state during transportation.

12. The apparatus of claim 11, wherein the plurality of lithium-ion batteries is secured to the isolation platform by a rack mounted onto the isolation platform.

13. The apparatus of claim 12, further comprising an enclosure secured to the trailer, wherein the enclosure is to protect the plurality of lithium-ion batteries from weather elements.

14. The apparatus of claim 13, further comprising a dampener to connect a top portion of the rack to a ceiling of the enclosure, wherein the dampener is to secure the rack and to reduce motion of the rack relative to the trailer.

15. The apparatus of claim 11, further comprising a shock sensor to collect force data of forces exerted on the plurality of lithium-ion batteries continuously during transportation.

16. The apparatus of claim 15, further comprising a monitoring system is to transmit the force data to an operator during transportation.

17. The apparatus of claim 10, further comprising a weather sensor to collect weather data associated with conditions to which the plurality of lithium-ion batteries are subjected.

18. A method comprising:
    dampening forces exerted on an isolation platform with a plurality of isolators;
    mounting a rack of lithium-ion batteries to store energy at a utility-scale to the isolation platform;
    transporting the lithium-ion batteries in an operational state from a first location to a second location, wherein the lithium-ion batteries is racked during transportation; and collecting force data of forces exerted on the lithium-ion batteries during transportation.

19. The method of claim 18, further comprising transmitting the force data to an operator during transportation.

20. The method of claim 18, further comprising collecting weather data associated with conditions to which the lithium-ion batteries are subjected during transportation.

* * * * *